United States Patent
Tsuchiya et al.

(10) Patent No.: US 10,026,011 B2
(45) Date of Patent: Jul. 17, 2018

(54) MASK INSPECTION APPARATUS, MASK EVALUATION METHOD AND MASK EVALUATION SYSTEM

(71) Applicant: NuFlare Technology, Inc., Yokohama (JP)

(72) Inventors: Hideo Tsuchiya, Tokyo (JP); Nobutaka Kikuiri, Kanagawa (JP); Ikunao Isomura, Kanagawa (JP)

(73) Assignee: NuFlare Technology, Inc., Yokohama (JP)

( * ) Notice: Subject to any disclaimer, the term of this patent is extended or adjusted under 35 U.S.C. 154(b) by 139 days.

(21) Appl. No.: 14/748,967

(22) Filed: Jun. 24, 2015

(65) Prior Publication Data
US 2015/0379707 A1 Dec. 31, 2015

(30) Foreign Application Priority Data
Jun. 26, 2014 (JP) ................................. 2014-131938

(51) Int. Cl.
*G06T 7/00* (2017.01)
*G06K 9/62* (2006.01)

(52) U.S. Cl.
CPC ............ *G06K 9/6218* (2013.01); *G06T 7/001* (2013.01); *G06T 2207/30148* (2013.01)

(58) Field of Classification Search
CPC ........ G06K 9/6218; G06T 2207/30148; G06T 7/001

(Continued)

(56) References Cited

U.S. PATENT DOCUMENTS

2002/0041377 A1* 4/2002 Hagiwara ............... G03F 7/706
356/399
2002/0164065 A1* 11/2002 Cai .................. G01N 21/95607
382/149

(Continued)

FOREIGN PATENT DOCUMENTS

CN 102884609 A 1/2013
JP 2009-198737 9/2009

(Continued)

OTHER PUBLICATIONS

Combined Taiwanese Office Action and Search Report dated Jun. 23, 2016 in Patent Application No. 104116685 (with English language translation).

(Continued)

*Primary Examiner* — Zhihan Zhou
(74) *Attorney, Agent, or Firm* — Oblon, McClelland, Maier & Neustadt, L.L.P.

(57) ABSTRACT

A mask inspection apparatus includes an optical image acquisition unit configured to acquire an optical image by irradiating light on a mask, a reference image generation unit configured to generate a reference image from design data of the mask, a comparison circuit configured to compare the optical image with the reference image, a pattern data extraction unit configured to obtain coordinates of a defective portion determined to be defective by the comparison unit and to extract, from the design data, pattern data of a predetermined dimension range including the coordinates, and an interface unit configured to supply an aerial image measurement apparatus with information associated with the defect, the information including the defect coordinates and the extracted pattern data.

13 Claims, 6 Drawing Sheets

(58) Field of Classification Search
USPC .......................................................... 348/126
See application file for complete search history.

(56) References Cited

U.S. PATENT DOCUMENTS

| | | | |
|---|---|---|---|
| 2004/0179726 A1 | 9/2004 | Burdorf et al. | |
| 2006/0236294 A1* | 10/2006 | Saidin | G03F 1/36 700/110 |
| 2007/0156379 A1* | 7/2007 | Kulkarni | H01L 21/67005 703/14 |
| 2007/0260419 A1* | 11/2007 | Hagiwara | G03F 7/70358 702/150 |
| 2008/0304056 A1* | 12/2008 | Alles | G03F 1/84 356/237.5 |
| 2009/0170014 A1 | 7/2009 | Shibazaki | |
| 2009/0257645 A1* | 10/2009 | Chen | G01R 31/31851 382/145 |
| 2011/0044529 A1* | 2/2011 | Tsuchiya | G01N 21/95607 382/144 |
| 2011/0176719 A1* | 7/2011 | Inoue | G06T 7/001 382/149 |
| 2012/0140060 A1* | 6/2012 | Tsuchiya | G01N 21/95607 348/126 |
| 2013/0114081 A1 | 5/2013 | Fukazawa | |
| 2015/0131892 A1 | 5/2015 | Tsuchiya et al. | |
| 2016/0093040 A1* | 3/2016 | Sousa | G01N 21/956 382/149 |

FOREIGN PATENT DOCUMENTS

| | | |
|---|---|---|
| JP | 2011-39013 A | 2/2011 |
| JP | 2012-89580 A | 5/2012 |
| JP | 4933601 | 5/2012 |
| TW | 200931290 A | 7/2009 |
| TW | 201132962 A1 | 10/2011 |
| TW | 201312298 A1 | 3/2013 |
| TW | 1396225 B | 5/2013 |

OTHER PUBLICATIONS

C.Y. Chen, et al., "Mask Defect Auto Disposition based on Aerial Image in Mask Production", Proc. of SPIE, vol. 7379, 2009, 2 pages.

Office Action dated Nov. 21, 2016 in Korean Patent Application No. 10-2015-0089422 (with English language translation).

* cited by examiner

MASK INSPECTION APPARATUS, MASK EVALUATION METHOD AND MASK EVALUATION SYSTEM

CROSS-REFERENCE TO THE RELATED APPLICATION

The entire disclosure of the Japanese Patent Application No. 2014-131938, filed on Jun. 26, 2014 including specification, claims, drawings, and summary, on which the Convention priority of the present application is based, are incorporated herein in its entirety.

FIELD OF THE INVENTION

The present invention relates to a mask inspection apparatus, mask evaluation method, and mask evaluation system.

With high integration and large capacity of a Large Scale Integration (LSI), a circuit dimension required for a semiconductor element has become increasingly narrowed. By using an original image pattern (that is, a mask or a reticle, hereinafter collectively referred to as a mask) in which a circuit pattern is formed, the pattern is exposed and transferred onto a wafer by a reduction projection exposure apparatus, called a stepper or a scanner, to form a circuit on the wafer, thereby producing a semiconductor element.

Since LSI production requires a large manufacturing cost, it is crucial to improve the production yield. On the other hand, in a contemporary semiconductor device, a pattern having a line width from ten nanometers to twenty nanometers is required to be formed. At this point, a defect of the mask pattern can be cited as a large factor of degradation in the production yield. As the dimensions of an LSI pattern to be formed on a semiconductor wafer becomes finer, the defect of the mask pattern becomes finer.

As fluctuations of various process conditions are absorbed by enhancing dimensional accuracy of the mask, it is necessary to detect the defect of the extremely small pattern in a mask inspection. Therefore, high accuracy is required for an inspection apparatus that inspects patterns of a mask.

In the mask inspection apparatus, light emitted from a light source is irradiated onto a mask through an optical system. The mask is loaded and chucked on a stage, and the illuminated light scans the mask by movement of the stage. The light transmitted through or reflected by the mask, images on a sensor through lenses of an optical system. Then, the defect inspection with respect to the mask is performed based on the optical images acquired by the sensor.

A die-to-die comparison inspection method and a die-to-database comparison inspection method are known as examples of mask inspection methods performed using the mask inspection apparatus. In the die-to-die comparison method, an optical image of a pattern and another optical image of the identical pattern at a different position are compared with each other. On the other hand, in the die-to-database comparison method, a reference image generated from design data used in mask production and an optical image of the actual pattern formed in the mask are compared with each other.

In order to acquire an optical image, a charge accumulation type time delay integration (TDI) sensor and a sensor amplifier that amplifies the output of the TDI sensor are used. In a case of a half-tone type phase shift mask inspection using a transmitted light, a defect is determined by recognizing a mask pattern by a light signal intensity of the acquired sensor image through the detection optical system like a chrome mask, because the sensor image has enough contrast between the light shielding film and the glass substrate of the halftone type phase shift mask.

Depending on the shape of the defect, the reflection image may have a favorable contrast, so there is also an inspection method using a reflection inspection optical system for the purpose of a particle inspection function or the like. In addition, there is adopted a method of performing defect inspection with high detection sensitivity by correcting out-of-focus of transmitted irradiation light by a variation in a thickness of a mask.

As described above, with the microfabrication of the LSI, the data amount and complexity of the patterns on the mask are rapidly increasing, thus causing an increase in mask inspection time. Furthermore, with the defect size to be detected has become finer, the insufficiency in the optical resolution or in the S/N ratio of the signal used for defect detection of the mask inspection apparatus becomes so significant that frequent occurrence of pseudo defects are caused. In addition, as a result of adding complicated optical proximity correction (OPC) or resolution enhancement techniques (RET) patterns, the patterns on the mask greatly deviate from the pattern shape to be transferred on the wafer and as a result the process of determining defects has become difficult.

That is, the defect detected by the mask inspection apparatus is a defect obtained by detecting a shape abnormality of the patterns on the mask. In practice, in a case of exposure transfer on the wafer, it may be impossible to determine whether the defect will affect a critical dimension error or a pattern bridge defect of a wafer pattern.

In a mask production process, the determination of the defect is supported by providing, for example, an apparatus for optically simulating an aerial image of a mask transferred and exposed by an exposure device. The apparatus obtains a simulated exposure transfer image of a defective portion, compares the defective portion with a normal portion, and determines whether the defective portion is acceptable or not acceptable.

As an evaluation apparatus, a lithography simulation microscope, that is, an apparatus for optically simulating an aerial image transferred from a mask and exposed by an exposure apparatus, is used to observe the aerial image in an optical condition equivalent to an actual wafer exposure condition; compare the observed aerial image with an aerial image of a normal portion; and determine a defect.

As for the apparatus for optically simulating the aerial image transferred from the mask and exposed by the exposure device, an aerial image measurement system (AIMS (registered trademark) manufactured by Carl Zeiss) or the like is known (see JP 2009-198737 A). Hereinafter, the apparatus for optically simulating the aerial image transferred from the mask and exposed by the exposure device is collectively referred to as an aerial image measurement apparatus.

With the advancement in various super-resolution technologies in response to recent pattern microfabrication, an OPC pattern (assist pattern) having a complicated shape is added to a pattern to be formed on a wafer, thereby a pattern of which a line width uniformization and a misplacement correction is performed, is exposed and transferred on the wafer. In a case where a defect is detected in such a complicated OPC pattern portion, it is hard to generate an appropriate reference image for determining whether the defect will be enhanced to become a serious defect of a wafer pattern.

Therefore, a method is being used in a similar fashion to a mask inspection, that is, a method in which an aerial image measurement apparatus inputs design pattern data or drawing data formed on the basis of a mask design or drawing, and obtains an ideal wafer aerial image based on a transfer exposure condition to make a reference image of a normal portion.

There is an established operation wherein the defect detected by the mask inspection apparatus is reviewed by an operator after an inspection, then defect classification is performed by determining whether or not a pattern repair is necessary, and then the defect information is sent to a repair process with coordinates and image of a portion to be repaired. A repair tool specifies the portion to be repaired, based on the attached coordinates and image, and then repairs the pattern.

The present invention has been devised to solve the problem described above. An object of the present invention is to provide a mask evaluation system, which is capable of determining a criticality of a mask defect based on the degree of influence on transfer to a wafer by devising a method for cooperation between a mask inspection apparatus and an aerial image measurement apparatus, and is capable of reducing mask manufacturing process time and improving the efficiency of mask inspection and evaluation by designating and repairing only a defect to be repaired.

Another object of the present invention is to provide a mask inspection apparatus and a mask evaluation method to be used in the mask evaluation system.

Other advantages and challenges of the present invention are apparent from the following description.

SUMMARY OF THE INVENTION

According to one aspect of the present invention, a mask inspection apparatus includes an optical image acquisition unit for acquiring an optical image by irradiating light on a mask. A reference image generation unit generates a reference image from design data of the mask. A comparison unit compares the optical image with the reference image. A pattern data extraction unit obtains coordinates of a defective portion determined to be defective by the comparison unit and extracts, from the design data, pattern data of a predetermined dimension range including the coordinates. An interface unit supplies an aerial image measurement apparatus with information associated with the defect, the information including the defect coordinates and the extracted pattern data.

According to another aspect of the present invention, in a mask evaluation method, a mask is evaluated by combining a mask inspection apparatus configured to inspect a defect of the mask by irradiating light on a mask, and an aerial image measurement apparatus configured to optically simulate an aerial image transfer-exposed from the mask in an exposure device. The mask evaluation method includes comparing an optical image acquired by irradiating light on the mask with a reference image generated from design data of the mask. From the design data, pattern data of a predetermined dimension range including coordinates of a defective portion determined to be defective by the comparisons is extracted. Information associated with the defect is supplied from the mask inspection apparatus to the aerial image measurement apparatus. The information includes the defect coordinates and the extracted pattern data.

According to another aspect of the present invention, in a mask evaluation system, a mask is evaluated by combining a mask inspection apparatus configured to inspect a defect of the mask by irradiating light on a mask, and an aerial image measurement apparatus configured to optically simulate an aerial image transfer-exposed from the mask in an exposure device. The mask evaluation system includes an optical image acquisition unit configured to acquire an optical image by irradiating light on a mask. A reference image is generated from design data of a mask by the reference image generation unit. A comparison unit compares the optical image with the reference image. A pattern data extraction unit obtains coordinates of a defective portion determined to be defective by the comparison unit and extracts, from the design data, pattern data of a predetermined dimension range including the coordinates. An interface unit supplies an aerial image measurement apparatus with information associated with the defect, the information including the defect coordinates and the extracted pattern data. The aerial image measurement apparatus includes a comparison reference information generation unit for generating comparison reference information by applying the defect coordinates from a reference image used in the aerial image measurement apparatus. An optical system of the aerial image measurement apparatus irradiates illumination light passing through a filter on the mask to acquire an aerial image corresponding to the defective portion transfer-exposed by a CCD camera provided on a focal plane through an aperture. A criticality determination unit determines a criticality based on a calculated value of error of a line width and a hole diameter using the comparison reference information and an aerial image corresponding to the defective portion.

DESCRIPTION OF THE EMBODIMENT

Figure 1:
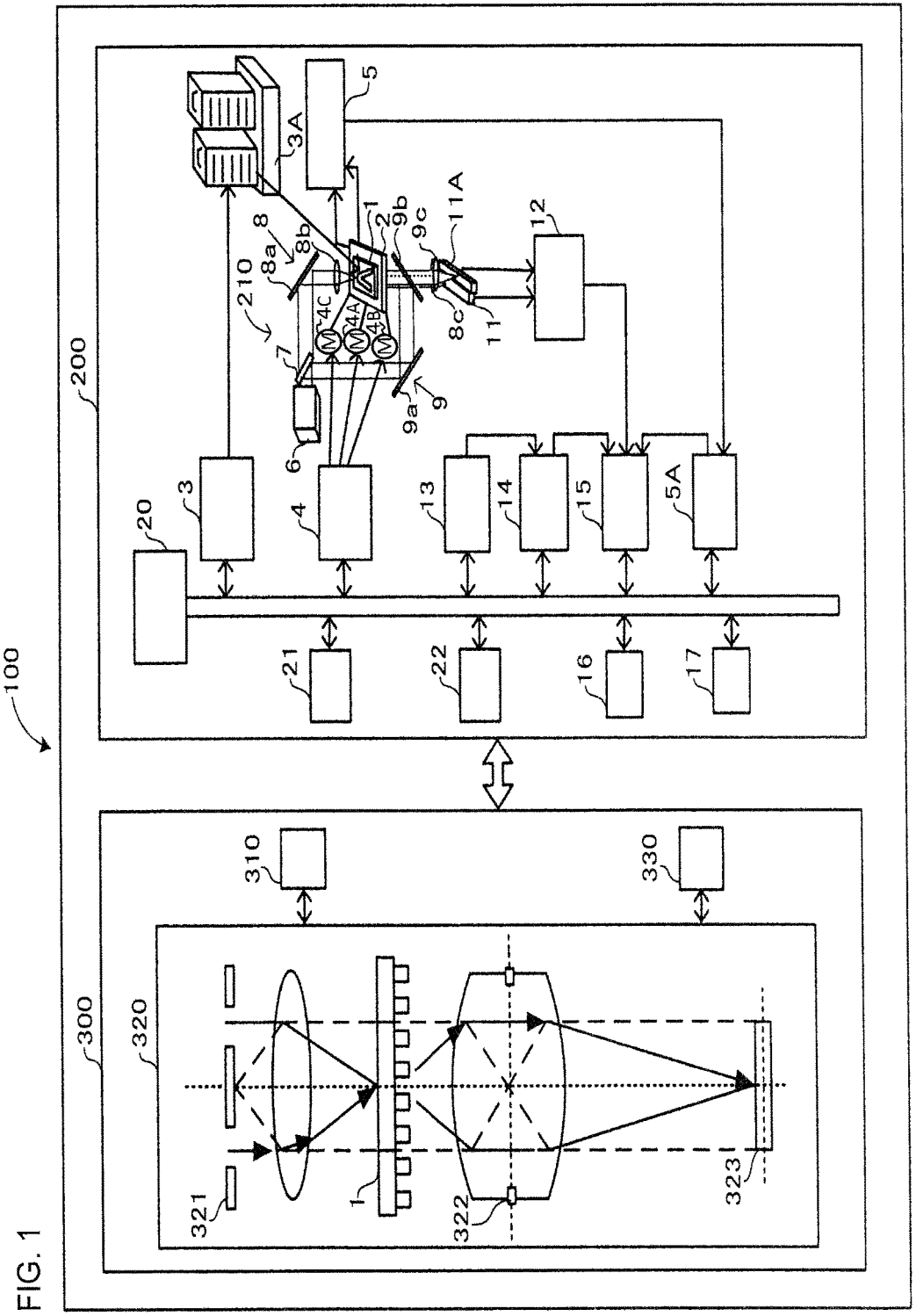
FIG. 1 is a schematic diagram illustrating a configuration of a mask evaluation system according to the present embodiment.

The embodiments will now be described with reference to the accompanying drawings, wherein the same reference numerals designate corresponding or identical elements throughout the various drawings.

FIG. 1 is a schematic diagram illustrating a configuration of a mask evaluation system 100 as an example of a mask evaluation system according to the present invention.

In the mask evaluation system 100 as shown in FIG. 1, a configuration unit necessary to the present embodiment is illustrated. However, another well-known configuration unit necessary for an inspection may be included. Further, the component described as the "unit" or "circuit" in the present embodiment, may be constructed by a program on a computer. However, the unit or circuit may also be implemented by not only a software program but also a combination of hardware and software, or a combination of software and firmware. In the case that the unit or circuit is constructed using a program, the program can be recorded in a recording device such as a magnetic disk device.

The mask evaluation system 100 illustrated in FIG. 1 includes a mask inspection apparatus 200 and an aerial image measurement apparatus 300. The mask inspection apparatus 200 and the aerial image measurement apparatus 300 are connected through a network such as Ethernet (registered trademark) or are directly connected through a dedicated data bus. The mask inspection apparatus 200 and the aerial image measurement apparatus 300 will be described with reference to FIG. 2 and FIG. 3.

Figure 2:
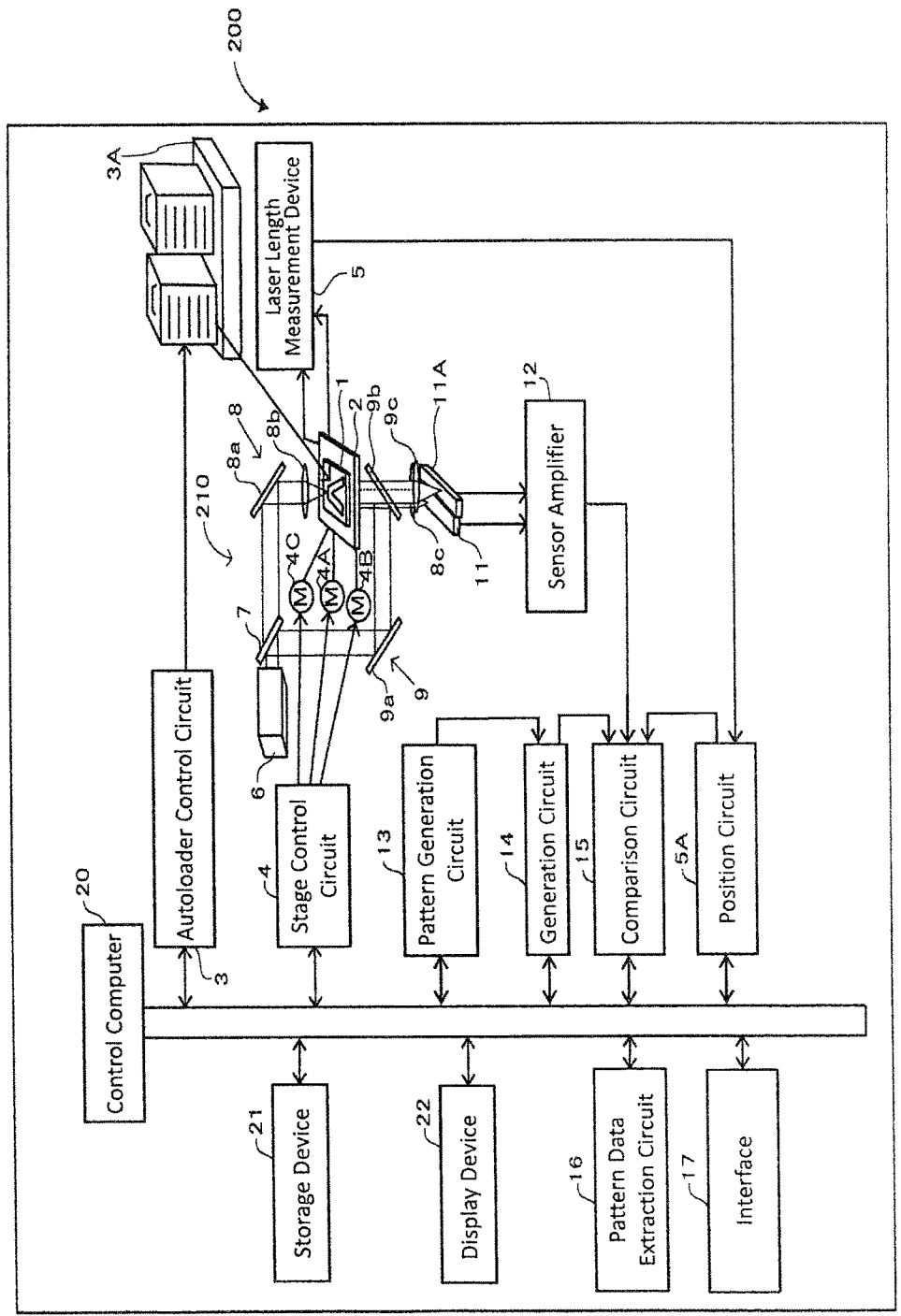
FIG. 2 is a schematic diagram illustrating a configuration of a mask inspection apparatus according to the present embodiment.

FIG. 2 is a schematic diagram illustrating a configuration of a mask inspection apparatus 200.

As shown in FIG. 2, the optical image acquisition unit 210 for acquiring an optical image includes a stage 2, an autoloader control circuit 3, an autoloader 3A, a stage control circuit 4, motors 4A, 4B, 4C, a laser length measuring device 5, a position circuit 5A, a light source 6, a beam splitter 7, optical systems 8 and 9, TDI sensors 11, 11A, and a sensor amplifier 12. Each component of the mask inspection system 200 will be described as follows.

The mask inspection apparatus 200 includes a stage 2 that holds a mask 1 as an inspection target. The mask 1 is conveyed to the stage 2 from an autoloader 3A. The autoloader 3A is controlled by an autoloader control circuit 3.

The stage 2 is driven in an X-direction, a Y-direction, and a θ direction by an X-direction motor 4A, a Y-direction motor 4B, and a θ-direction (horizontal rotating direction) motor 4C, as an example of a driving unit. The driving control of the motors 4A, 4B, and 4C is performed by a stage control circuit 4.

Figure 6:
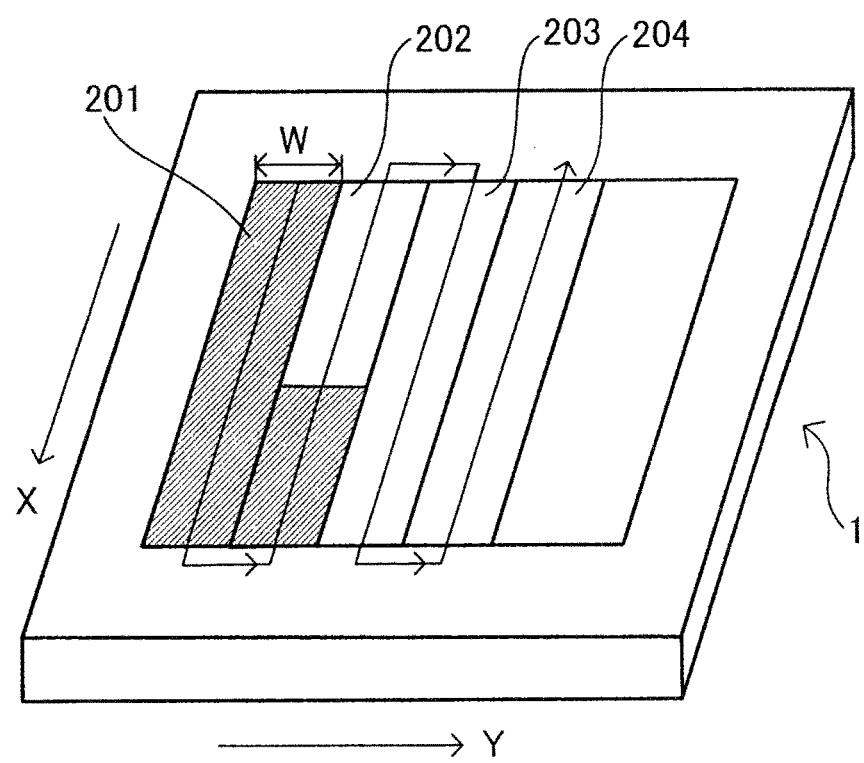
FIG. 6 is a schematic diagram illustrating an acquisition procedure of an optical image.

As an example, positions of the stage 2 in the X-direction and Y-direction are detected by a laser length measuring device 5 such as a laser interferometer, and a position circuit 5A connected to the laser length measuring device 5. For example, as shown in FIG. 6, the optical images of the mask 1 are acquired by the sensor while the mask 1 continuously moves at a constant speed in the X-direction. After the mask 1 is moved to the end (stripe end) of the X-direction, the mask is moved in the Y-direction, the optical images are then acquired by the sensor while the mask 1 continuously moves at a constant speed in a direction opposite to the X-direction. The optical images of the whole inspection area of the mask 1 are acquired by repeating the above-mentioned process.

The mask inspection apparatus 200 also includes a light source 6 to emit a laser beam as an example of a light irradiation device. The mask inspection apparatus 200 includes an optical system 8 that transmits the laser beam emitted from the light source 6 by irradiating the laser beam on the mask 1 through a beam splitter 7, and an optical system 9 that reflects the laser beam emitted from the light source 6 by irradiating the laser beam on the mask 1 through the beam splitter 7.

The optical system 8 includes a mirror 8a, an objective lens 8b, an objective lens 8c that forms an image with transmitted light on a TDI sensor 11 as an example of an image sensor. The optical system 9 includes a mirror 9a, a beam splitter 9b, an objective lens 9c that forms an image with reflected light on a TDI sensor 11A as an example of an image sensor. Hereinafter, in a case where there is no need to distinguish the optical system 8 from the optical system 9, the same descriptions as the configuration of the optical system 8 will be used for the optical system 9.

The TDI sensor 11 is comprised of a two-dimensional CCD sensor having an imaging region of 2,048 pixels×512 pixels (144 μm×36 μm in a case where 1 pixel is 70 nm×70 nm), as one example. That is, the TDI sensor 11 is configured by a plurality of stages (for example, 512 stages) of lines in a TDI direction. Each of the lines L is configured by a plurality of pixels (for example, 2,048 pixels).

The TDI sensor 11 is installed such that the TDI direction (direction of 512 stages) of the TDI sensor 11 is matched with the X-direction of the stage 2, and the TDI sensor 11 is moved relative to the mask 1 in response to the movement of the stage 2. In this way, the pattern of the mask 1 is captured by the TDI sensor 11.

When the moving direction of the stage 2 is reversed, the accumulation direction of the TDI sensor 11 is also reversed, as the result, the TDI) sensor 11 is moved relative to the mask 1. In the mask inspection apparatus 200 according to the present embodiment, the TDI sensor 11 is used as the image sensor, however another sensor such as a line sensor or an area sensor may be used instead of the TDI sensor 11.

The TDI sensor 11 is connected with the sensor amplifier 12. A light amount signal of each pixel input from the TDI sensor 11 is converted to a normalized optical image by the sensor amplifier 12. The optical image output from the sensor amplifier 12 is input into the comparison circuit 15 as an example of a comparator, together with data output from the position circuit 5A indicating a position of the mask 1 on the stage 2.

The mask inspection apparatus 200 also includes a pattern generation circuit 13, and a reference image generation circuit 14 as a reference image generation unit for generating a reference image with which the optical image is compared.

The pattern generation circuit 13 takes CAD data (drawing data) or the like stored in the storage device 21 and outputs the generated data to the reference image generation circuit 14. That is, the pattern generation circuit 13, for example, reads design pattern data from the storage device 21 through the control computer 20 and converts it into 2-bit or other multiple-bit image data (design image data).

The reference image generation circuit 14 generates a reference image by performing a process of resizing, a corner rounding process, and a point spread function (PSF) filter process to the generated data input from the pattern generation circuit 13, and outputs the reference image to the comparison circuit 15.

Design pattern data which is used as reference data in a die-to-database inspection method is stored, for example, in the storage device 21. This data is read out and sent to the pattern generation circuit 13 in accordance with the inspection process. The pattern generation circuit 13 converts the design pattern data into image data (or design pattern data). This image data is then sent to the reference image generation circuit 14 for generation of reference data.

The comparison circuit 15 compares the optical image input from the sensor amplifier 12 with the reference image input from the reference image generation circuit 14, and detects a shape defect of the pattern based on the shape difference of the pattern between the optical image and the reference image, and specifies the coordinate of the defect which is determined by the comparison.

The comparison circuit 15 compares the portion of the optical image received from the sensor amplifier 12 with the corresponding portion of the reference image generated by the reference image generation circuit 14 in accordance with a suitable comparison determination algorithm, and if the difference (e.g., in dimension) between these portions exceeds a predetermined value, the comparison circuit 15 determines that the portion of the optical image has a defect. When it is determined that a portion of the optical image contains a defect, then a coordinate of the defect is supplied to a pattern data extraction circuit 16, and the coordinate, the sensor image and the reference image on which the detection of the defect is based, are supplied to the aerial image measurement apparatus 300 through an interface 17.

In addition, the inspection result of the comparison circuit 15, for example, can be stored in the storage device 21, and the operator can then confirm the inspection result by browsing the stored inspection result from the storage device 21 on the display device 22 such as a monitor. The storage device 21 is, for example, a magnetic disk device, a magnetic tape device, an FD, a semiconductor memory, etc.

In the comparison circuit 15, a comparison determination algorithm is used in which transmission images and reflection images are combined. As a result of the comparison, in the case that a difference between the two exceeds a predetermined threshold, the position is determined to be a defect. Furthermore, rather than transmission images and reflection images being combined, a transmission image can be compared to another transmission image, or a reflection image can be compared to another reflection image.

As one example of the pattern data extraction unit, the pattern data extraction circuit 16 obtains coordinates of a specific portion determined as a defect by the comparison circuit 15 and extracts design pattern data of a predetermined dimension range including the coordinates.

That is, the pattern data extraction circuit 16 extracts, from the design pattern data, as much data as necessary to recognize the pattern in the vicinity of the defective portion, by using the design pattern data and the coordinates of the defective portion. This data is obtained by hierarchically representing an aggregate of a cluster, a cell, a frame, or a stripe, as examples of a graphic description aggregate. The predetermined dimension range is, for example, a unit of the cluster or the cell. The predetermined dimension range is a rectangular region, one side of which is practically several ten microns to several hundred microns.

In addition, the pattern data extraction circuit 16 extracts the same portion as the predetermined dimension range of the pattern data for designating the inspection sensitivity paired with the design data. That is, the pattern data extraction circuit 16 processes the pattern data used for generating the reference image and extracts a portion having the same coordinates as the pattern data for designating the inspection sensitivity paired with that pattern data.

The pattern data for designating the inspection sensitivity is data in which importance of each piece of data is specified as pattern importance information in addition to the pattern data. By extracting such importance information, the defective portion having high pattern importance can be preferentially evaluated. For example, the importance of each piece of data can be determined depending on the purpose of the use of a pattern. For example, high importance is assigned to a pattern used for clocks, and low importance is assigned to a pattern used for dummies or shields, furthermore medium importance is assigned to a pattern used for power supplies.

As one example of the interface unit, the interface 17 is configured to supply the aerial image measurement apparatus 300 with the information associated with the defect, including the pattern data extracted by the pattern data extraction circuit 16.

The information associated with the defect is the coordinates of the defect, the optical image of the defective portion, the mask inspection condition, the exposure condition of the aerial image measurement apparatus 300, or the like, or any combination thereof. The information associated with the defect is supplied from the reference image generation circuit 14, the comparison circuit 15, the pattern data extraction circuit 16, the storage device 21, or the like to the aerial image measurement apparatus 300 through the interface 17. The information associated with the defect is not limited to the above example and may be any information as long as the information is required by the aerial image measurement apparatus 300.

The mask inspection apparatus 200 includes a control computer 20 that performs an overall control, such as offset and gain adjustment of the sensor amplifier 12, alignment of the stage 2, etc., as well as the general pattern defect inspection. The control computer 20 is connected to the position circuit 5A, the autoloader control circuit 3, the stage control circuit 4, the pattern generation circuit 13, the reference image generation circuit 14, the comparison circuit 15, the pattern data extraction circuit 16, the interface 17, the storage device 21, the display device 22, etc.

Figure 3:
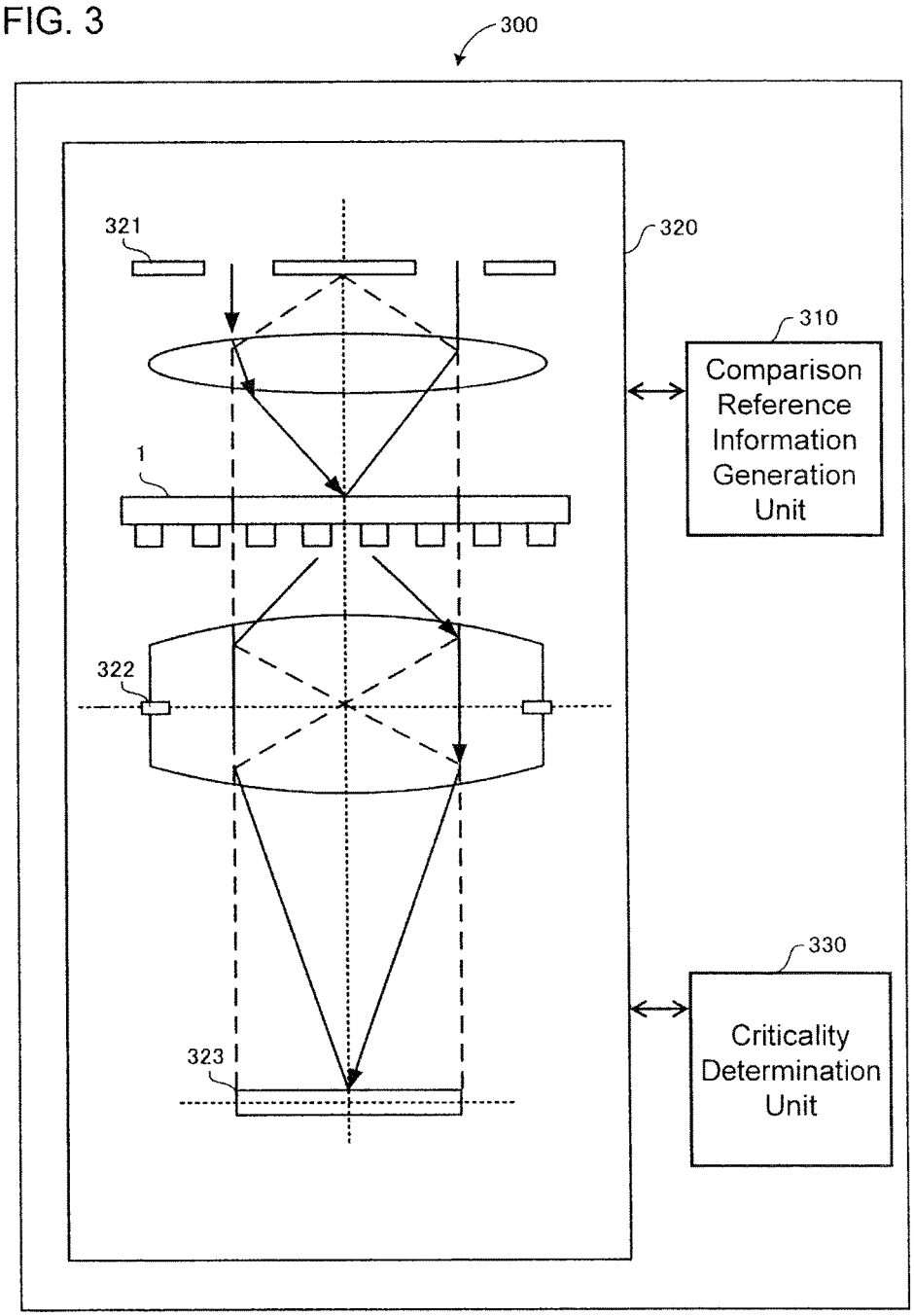
FIG. 3 is a schematic diagram illustrating a configuration of an aerial image measurement apparatus according to the present embodiment.

FIG. 3 is a schematic diagram illustrating a configuration of an aerial image measurement apparatus 300. The aerial image measurement apparatus 300 is an example of a lithography simulation microscope that includes a light source having the same wavelength as the semiconductor exposure apparatus and includes an illumination optical system equivalent to the exposure apparatus.

As illustrated in FIG. 3, the aerial image measurement apparatus 300 includes a comparison reference information generation unit 310, an optical system 320, and a criticality determination unit 330. The optical system 320 includes a filter 321 such as a pupil filter, an aperture 322, and a CCD camera 323. As in the mask inspection apparatus 200, the aerial image measurement apparatus 300 includes a control computer that performs an overall control, an interface unit for the mask inspection apparatus 200, etc. The control computer, the interface unit, and the like are not described herein.

The comparison reference information generation unit 310 generates comparison reference information from the reference image used in the aerial image measurement apparatus 300 by using the defective portion supplied as the information associated with the defect. That is, the comparison reference information generates the information corresponding to the defect from the reference image used in the aerial image measurement apparatus 300 by applying the information determined as the defect by the mask inspection apparatus 200, that is, information of the coordinates of the defect, the extracted pattern data, etc.

The illumination light is irradiated on the mask 1 placed in the aerial image measurement apparatus 300. The illumination light passes through the filter 321, is irradiated on the mask 1, and is transfer-exposed through the aperture 322 to the CC) camera 323 provided on a focal plane. That is, in the aerial image measurement apparatus 300, the aerial image is obtained by transfer-exposing the defective portion of the mask 1.

The criticality determination unit 330 determines the criticality by using the comparison reference information generated from the reference image based on the defective portion and the aerial image based on the defective portion. Specifically, based on the comparison reference information and the aerial image, the criticality determination unit 330 obtains a calculated value of error of a line width and a hole diameter, and determines the criticality. In the present embodiment, the criticality determination unit 330 is configured by the aerial image measurement apparatus 300, but is not limited thereto. For example, the criticality determination unit 330 may be configured by an independent device to receive the comparison reference information from the aerial image measurement apparatus 300 and the aerial image corresponding to the defective portion and determine the criticality.

The information of the criticality determined by the criticality determination unit 330 is supplied from the aerial image measurement apparatus 300 to the mask inspection apparatus 200. Then, in the comparison circuit 15 of the mask inspection apparatus 200, a correlation between the information of the criticality supplied from the aerial image measurement apparatus 300, and the threshold value used to determine the defect in the comparison circuit 15, is obtained. Then the comparison circuit 15 reconfigures the threshold value of the mask defect determination based on the correlation.

In a case where the criticality is determined to be large, the correlation is a relationship that makes the inspection sensitivity high, that is, makes the threshold value small. On the other hand, in a case where the criticality is determined to be small, the correlation is a relationship that makes the inspection sensitivity low, that is, makes the threshold value large.

For example, in a case where the defective portion has an assist bar, a line width of an aerial image where a main pattern and an assist bar are combined is determined to be defective when the abnormal portion has an error in size exceeding 10% of the normal portion. On the other hand, in the evaluation of the aerial image measurement apparatus 300, it can be determined to be non-defective even when the error exceeds 10% in size, and determined to be defective when the error is 20% in size. In such a case, the threshold value intended for this result may be reconfigured. That is, in this case, since the criticality is determined to be small, the threshold value may be reset to a predetermined value such that the inspection sensitivity is low, that is, the threshold value is large.

The above-described correlation is based on the criticality and the threshold value in the portion determined to be defective. The result of the defect algorithm using inspection parameters, such as a shape, an area, etc. of the defective portion, may be applied to another defective portion. For example, as the result of the defect algorithm, in a case where the inspection region is specified as the assist bar, the threshold value of this region may be reconfigured using the result of the correlation that is already obtained.

The above-described mask inspection apparatus 200 can be supplied with the criticality processed in the criticality determination unit 330 of the aerial image measurement apparatus 300, or the criticality processed in the criticality determination unit configured independently, to obtain the correlation of the criticality and the threshold value for processing the defect processing; and set a new threshold value.

The aerial image measurement apparatus 300 determines the criticality on a scale of a degree of influence of transfer in a wafer. That is, the defect detected by the mask inspection apparatus 200 is a defect obtained by detecting a shape abnormality of the patterns on the mask. In practice, in the case of exposure transfer on the wafer, it may be impossible to determine whether the defect affects a line width error, a broken pattern defect, or a pattern bridge defect of a wafer pattern. That is, the defect is evaluated by the aerial image measurement apparatus 300, and, for example, it is determined that the criticality is large when the defect has a high degree of influence, for example, a broken pattern defect. On the other hand, it is determined that the criticality is small when the defect has a small degree of influence.

In the mask inspection apparatus 200, the criticality is supplied to the comparison circuit 15, then the correlation between the supplied criticality and the value used to determine the defect in the comparison circuit 15 is obtained. The threshold value is then reconfigured based on the correlation in the comparison circuit 15. The reconfiguration is performed such that the threshold value becomes small when the criticality is large, and on the other hand, the threshold value becomes large when the criticality is small. For example, in a case where the defective portion is an assist bar, the criticality is determined to be small, and it is possible to avoid a non-defective product from being determined as a defective product by making a threshold value large.

In addition, the aerial image measurement apparatus 300 can obtain the aerial image in a situation substantially equivalent to a situation in which the mask 1 is exposed by an actual exposure device. By using the aerial image measurement apparatus 300, the quality of the mask can be evaluated in a mask generating step under the same environment as the actual exposure device. For example, hot spots can be detected. In addition, the aerial image measurement apparatus 300 obtains information of a transfer defect based on a transfer image that is a pattern to be transferred which is obtained by an inspection in a limited area.

Lithography simulation that estimates the exposure image subjected to exposure transfer is a configuration in which surface observation is performed, however as there is only a small amount of information, the defect caused by the mask production process cannot be detected. On the other hand, the aerial image measurement apparatus 300 is configured to use the aerial image as a transmission image of the actual mask, not the lithography simulation.

Figure 4:
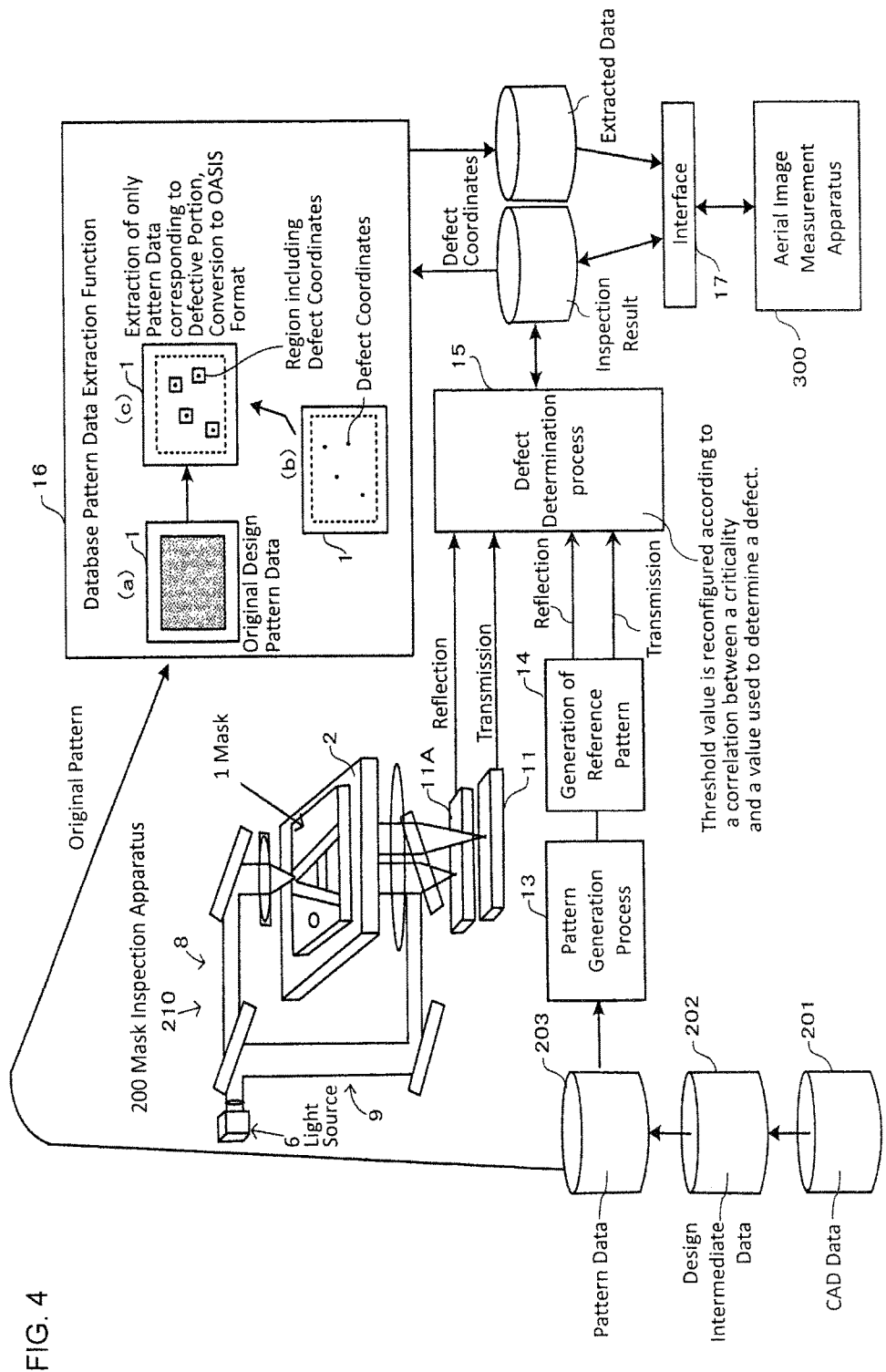
FIG. 4 is a schematic diagram illustrating a data flow according to the present embodiment.

FIG. 4 is a schematic diagram showing a flow of data according to the present embodiment.

As shown in FIG. 4, CAD data 201 prepared by the designer (or user) is converted to design intermediate data 202 in a hierarchical format such as OASIS. The design intermediate data 202 includes data of the pattern to be formed on the mask created for each layer. The mask inspection apparatus 200 is not adapted to be able to directly read the design intermediate data 202 such as OASIS.

That is, each manufacturer of the mask inspection apparatus 200 uses different format data. Therefore, the design intermediate data 202 is converted, for each layer, to format data 203 as pattern data specific to the mask inspection apparatus 200, and the format data 203 is input to the mask inspection apparatus 200. Although the format data 203 may be data specific to the mask inspection apparatus 200, the format data 203 may also be data compatible with a writing apparatus.

The format data 203 is stored in, for example, the storage device 21 of the mask inspection apparatus 200. Further, a group of pattern features, defined in an area of approximately a few tens of micrometers square of the format data 203 is generally referred to as a "cluster" or "cell". It is common practice that the data is defined in a hierarchical structure using clusters or cells. A cluster or cell, which contains a pattern feature or features, may be used alone or repeated at certain intervals. In the former case the coordinate positions of the cluster (or cell) on the photomask are specified, whereas in the latter case the coordinate positions of each copy of the cluster (or cell) are indicated together with a repetition instruction.

Each cluster or cell is disposed in a strip-shaped region, referred to as a "frame" or "stripe", having a width of a few hundreds of micrometers and a length of approximately one hundred millimeters which correspond to the total length of the photomask in the X-direction or Y-direction.

In the format data 203 (design pattern data), which is stored in the storage device 21, data of a portion necessary for a pattern being observed is read out to the pattern generation circuit 13 according to the progress of the mask inspection. The pattern generation circuit 13 interprets a graphic shape (graphic code), a graphic dimension, an arrangement position, and the like of the format data 203. Then, the pattern generation circuit 13 performs data generation processing of generating 2-bit or other multiple-bit design image data as pattern data disposed at squares in units of grids of a predetermined quantization dimension.

The generated design image data calculates an occupancy rate occupied by the graphic in the design pattern with respect to each region (square) corresponding to the sensor pixel. The occupancy rate of the graphic in each pixel is a pixel value. The pattern data converted into the 2-bit or other multiple-bit image data (bit pattern data) as described above is transmitted to the reference image generation circuit 14 that generates reference data (reference image). The reference image generation circuit 14 generates a reference pattern by performing an appropriate image filtering process for comparison with a mask observation image.

Figure 5:
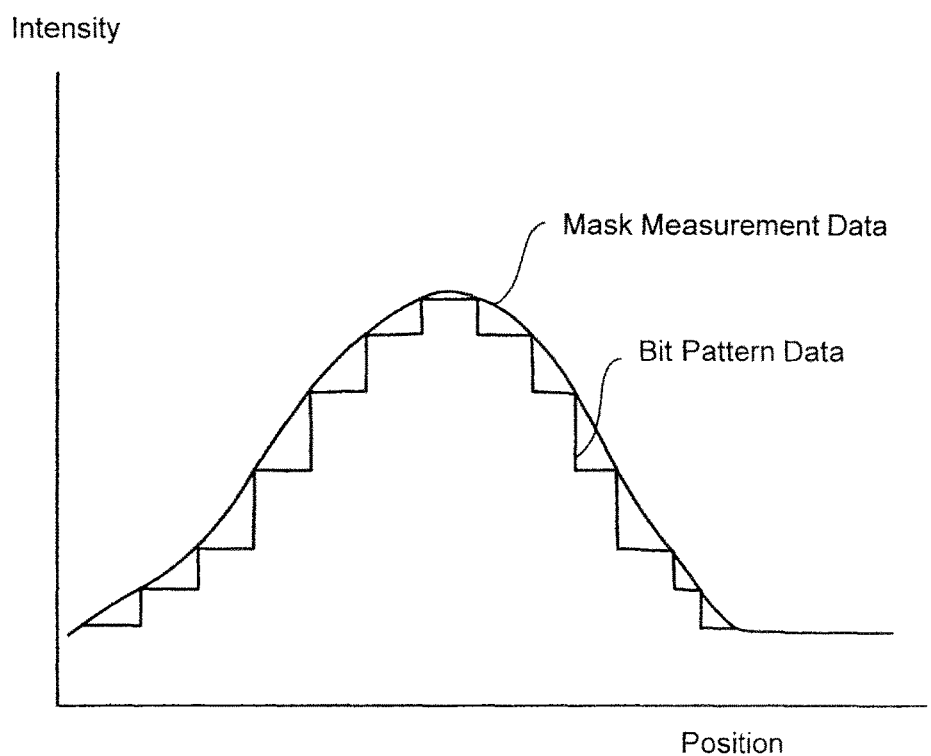
FIG. 5 is a diagram illustrating a filtering process.

At this point, the filtering process will be described. FIG. 5 is a diagram illustrating the filtering process. The line width of the pattern of the mask 1 is sometimes adjusted in the production process to form the finished dimension according to the designed dimension. Further, a corner of the pattern sometimes becomes bent in the process of the mask production. Accordingly, the optical image (mask observation image) to be observed by the inspection apparatus is not exactly the same as the design pattern. Moreover, the optical image output from the sensor amplifier 12 is somewhat "blurred" due to the resolution characteristics of the optical system and due to the aperture effect in the photodiode array, that is, this optical image is a spatially low-pass filtered image.

By performing the filtering process to the design pattern data that is 2-bit or other multiple-bit image data at the design side, that is, performing a process so that the design pattern data matches to the optical image, the reference image that could be compared with the optical image with high accuracy, is generated. Accordingly, the mask 1 to be inspected is observed before the inspection, thereby a filtering coefficient that simulates the change due to the production process of the mask 1 and the optical system of the inspection apparatus, is obtained. A two-dimensional digital filtering process is then performed to the design pattern data to make the reference image similar to the optical image.

A method of obtaining the optical image will be described using FIG. 4 and FIG. 6. The optical image acquisition unit 210 as shown in FIG. 4 acquires an optical image of a mask 1. The mask 1 is chucked on the table 2 provided to be moveable in two horizontal directions and rotation direction by each direction motor of X, Y, and θ. The detecting light from the light source 6 illuminates the mask 1 through the optical systems 8 and 9, and the pattern of the mask 1 is imaged in the TDI sensors 11 and 11A.

FIG. 6 is a schematic diagram illustrating an acquisition procedure of the optical image of the pattern formed in the mask 1. In FIG. 6, it is assumed that the mask 1 is positioned on the stage 2 in FIG. 2. The inspection region in the mask 1 is vertically divided into the stripe-shaped multiple inspection regions, namely, stripes $20_1$, $20_2$, $20_3$, $20_4$, . . . as illustrated in FIG. 6. For example, each stripe is a region having the width of several hundred micrometers and the length of about one hundred millimeters corresponding to the total length in the X-direction or Y-direction of the mask 1.

The optical image is acquired in each stripe. That is, in acquiring the optical image as shown in FIG. 6, the operation of the stage 2 is controlled such that each stripe $20_1$, $20_2$, $20_3$, $20_4$, . . . is continuously scanned. Specifically, the optical image of the mask 1 is acquired while the stage 2 is moved in the −X-direction as shown in FIG. 6. The image having a scan width W as shown in FIG. 6 is continuously input to the TDI sensor 11 as shown in FIG. 2.

That is, the image of the second stripe $20_2$ is acquired after the image of the first stripe $20_1$ is acquired. In this case, after the stage 2 moves in the −Y-direction in a stepwise manner, the optical image is acquired while the stage 2 moves in the direction (X-direction) opposite to the direction (−X-direction) in which the image of the first stripe $20_1$ is acquired, and the image having the scan width W is continuously input to the TDI sensor 11.

In the case that the image of the third stripe $20_3$ is acquired, after moving the stage 2 in the −Y-direction in the stepwise manner, the stage 2 moves in the direction opposite to the direction (X-direction) in which the image of the second stripe $20_2$ is acquired, namely, the direction (−X-direction) in which the image of the first stripe $20_1$, is acquired. An arrow in FIG. 6 indicates the direction and sequence for acquiring the optical image, and a hatched portion indicates the region where the optical image has already been acquired.

Next, the pattern images formed in the TDI sensors 11 and 11A are subjected to photoelectric conversion, and then subjected to A/D (Analog to Digital) conversion by the sensor amplifier 12. After that, the sensor data (optical image) subjected to A/D conversion is sent from the sensor amplifier 12 to the comparison circuit 15.

The pattern image as a basis for comparison that is generated in the reference image generation circuit 14 is sent to the comparison circuit 15 along with the data indicating the position of the mask 1 on the stage 2, which is input from the position circuit 5A. In the comparison circuit 15, the reference pattern image and the mask observing pattern data are compared to each other using a proper comparison determination algorithm, thereby the defect determination process is performed.

In the comparison circuit 15, a plurality of comparison determination algorithms are applied in parallel. In the case that any values of the algorithm exceed a predetermined threshold, the position is determined to be a defect. As a result of the comparison, in the case that a defect has been determined, a coordinate of the defect and the optical image (the reference image and the optical image), for example, warranting the defect determination are temporarily stored in the apparatus.

The inspection result obtained in the comparison circuit 15 is stored and the coordinates of the inspection result determined to be defective is sent to the pattern data extraction circuit 16. As illustrated in FIG. 4, the pattern data extraction circuit 16 (database pattern data extraction function) extracts a region including the defect coordinates from the format data 203 (original design pattern data) based on the coordinates.

As shown in FIG. 4, the portion (a) of the pattern data extraction circuit 16 is a diagram schematically illustrating the original design pattern drawn in the mask 1. The portion (b) is a diagram schematically illustrating the defective portion detected on the mask 1. The portion where the defect is detected is recorded in, for example, an X-Y coordinate system with the center of the mask as the origin. In addition, the pattern data for generating the reference image of the database inspection, that is, the original design pattern data illustrated in (a), is also described in the X-Y coordinate system with the center of the mask 1 as the origin.

In addition, the coordinate system is inverted symmetrically with respect to the Y-axis or the X-axis when the mask is viewed from the glass surface and when the mask is viewed from the film surface. However, here, both of the defect detection coordinates and the database pattern are assumed as being matched with each other in the coordinate systems viewed from the glass surface.

In the present embodiment, as illustrated in (c) of the pattern data extraction circuit 16 in FIG. 4, for example, as much data as necessary to recognize the pattern in the vicinity of the defective portion is extracted from the original design pattern data by using the original design pattern data and the coordinates of the defective portion. The pattern data is hierarchically represented by a cluster or a cell as an example of graphic description aggregate, further by a frame or a stripe as an example of aggregate. The aggregate such as the cluster, the cell, the frame, or the stripe is rectangular in a predetermined dimension range and, for example, has a left lower vertex as the origin.

There is a case where the reference pattern image of the defective portion is spread over a plurality of clusters, cells, frames, or stripes. Therefore, when the database data corresponding to the pattern of the defective portion is recorded in a necessary and sufficient range, it is practical to register a plurality of clusters or cells where the origin exists in a predetermined dimension range from the coordinates of the defective portion with respect to each of X and Y, instead of registering graphics one by one.

The extracted pattern data and the inspection result information including the coordinates of the defective portion are supplied to the aerial image measurement apparatus 300 via the interface 17. That is, a file, which is created by extracting the clusters or cells having the origin within the predetermined range from the design pattern data, is converted into data of the same format as the input design pattern data or a versatile OASIS format data, and is supplied to the aerial image measurement apparatus 300 via the interface 17.

The pattern data, which is extracted as the inspection result information including the coordinates of the defective portion, is information associated with the above-described defect. More specifically, the pattern data is the mask observation image including the defect shape, the reference image corresponding to the defective portion generated in the inspection apparatus, the coordinates of the defective portion, the scale (large, medium, small) indicating the degree of the defect measured by the inspection apparatus or a response value of the defect detection algorithm, discrimination as to whether detected by the transmitted light or detected by the reflected light, the accurate pixel size, the correction amount for alignment of the reference image and the sensor observation image (optical image) in the inspection apparatus, the white and back calibration amplitude of the inspection apparatus, and the light source wavelength of the inspection apparatus.

In addition, it is effective that the aerial image measurement apparatus 300 also provides the exposure condition necessary for accurately estimating the exposure aerial image. The exposure conditions are for example, a light source wavelength of an exposure device, a light source shape (for example, in the case of an annular illumination, an outer diameter, an inner diameter, the number of poles of a dipole illumination, an XY-direction of a dipole), etc.

Such information may be simultaneously provided with all defect detections after the mask inspection apparatus 200 completes the inspection of one mask, and is further provided with defect information obtained until this point whenever the defect is detected or a certain amount of detection has been completed while the inspection is performed by the mask inspection apparatus 200.

The aerial image measurement apparatus 300 includes the optical system 320 used for the above-described method of evaluating the defect transfer characteristics of the mask 1. The optical system 320 is an illumination optical system that includes a light source of the same wavelength as the semiconductor exposure device and is equivalent to the exposure device. As illustrated in FIG. 3, the illumination light passing through the filter 321 of the illumination optical system illuminates the mask 1, and the transfer image is obtained by the CCD camera 323 provided on the focal plane through the aperture 322.

In the evaluation of the transfer characteristics of the mask pattern, a predetermined reference value for specifying a condition to be acceptable as a product in a non-defective pattern section is previously calculated, a transfer image of the defective section or a defect-repaired pattern section is obtained, a critical dimension (CD) value and intensity of light are measured, and a decision to accept or not accept is performed. The degree of thickening or thinning of the line width may define the estimated line width of the normal portion and the defective portion in a dimension of nanometer unit, and may define it by a ratio of the estimated line width of the defective portion with respect to the normal portion.

The mask 1, which is inspected by the mask inspection apparatus 200, is further evaluated by the aerial image measurement apparatus 300. By evaluating the degree of influence on the transfer image of the defective portion, only the defective portion having a high degree of influence of transfer among the defective portions detected by the mask inspection apparatus 200 is repaired and the mask can then be shipped. In this case, the mask manufacturing time can be reduced by repairing only the portion required to be repaired, and it is therefore possible to avoid re-manufacturing the mask.

Specifically, the defective portion, which is detected by the mask inspection apparatus 200, can be observed by the aerial image measurement apparatus 300, the defect criticality can be evaluated in the exposure estimation state, and only the portion having a large criticality may be reviewed by an operator.

The term "review" as used herein means an operation performed by the operator to determine whether a detected defect can be tolerated. A review tool displays an image of the defective portion of the mask 1 while moving a table on which the mask 1 is placed, so as to observe the defective portion of each defect.

In addition, at the same time, the determination condition of the defect determination, the mask pattern image on which the determination has been based, and/or the reference image data and the exposure estimation image data are displayed on the screen side by side so as to identify them. Thereby, the determination to repair the mask pattern is facilitated. In general, since the reduction projection of about ¼ is performed from the mask 1 to the wafer, the scale is also considered when displaying side by side. It is preferable that, in a defect list, information having high defect criticality is attached and a mechanism to preferentially review these defects is prepared.

The operator reviews all the defects detected by the mask inspection apparatus 200, and if at least one of them requires repair, the mask 1 is sent on to a repair apparatus along with a defect information list. Because a repair method depends on whether the defect is projected or recessed, a defect type including the distinction between the projection and the recess, and the defect coordinate are added to the defect information list.

In addition, the mask inspection apparatus 200 reconfigures the threshold value according to the correlation between the criticality and the value used to determine the defect in the comparison circuit 15. During reconfiguration, the threshold value is set to a predetermined value so as to be small in the defective portion determined as having a large criticality and is set to a predetermined value so as to be large in the defective portion determined as having a small criticality.

In the mask evaluation system 100, the mask inspection apparatus 200 includes the pattern data extraction circuit 16 as the database pattern data extraction function, but is not limited thereto. For example, the pattern data extraction circuit 16 may be configured as an independent pattern data extraction apparatus.

According to the mask inspection apparatus, the mask evaluation method, and the mask evaluation system of the present embodiment described above, the mask defect image and the defect coordinates collected at the time of the defect detection in the mask inspection apparatus is supplied to the aerial image measurement apparatus as in the case of transmission to the repair tool. Therefore, the reference image generation of the defective portion is facilitated and the decision to pass or fail can be efficiently performed in the simulated exposure transfer image of the defective portion.

In addition, the pattern data is extracted from the database in the vicinity of the defective portion and is stored. The mask defect image and the extracted pattern data are simultaneously supplied to the aerial image measurement apparatus. Consequently, the decision to accept or not accept can be efficiently performed on the higher-accuracy simulated exposure transfer image.

The present invention is not limited to the embodiments described and can be implemented in various ways without departing from the spirit of the invention.

The above description of the present embodiment has not specified apparatus constructions, control methods, etc., which are not essential to the description of the invention, since any suitable apparatus construction, control methods, etc. can be employed to implement the invention. Further, the scope of this invention encompasses all mask inspection apparatuses, mask evaluation methods, and mask evaluation systems employing the elements of the invention and variations thereof, which can be designed by those skilled in the art.

What is claimed is:

1. A mask inspection apparatus comprising:
an optical image acquisition unit configured to acquire an optical image by irradiating light on a mask;
a reference image generation unit configured to generate a reference image from design data of the mask;
a comparison unit configured to obtain coordinates of a defective portion of the mask determined to be defective based on a threshold value by comparing the optical image with the reference image;
an interface unit configured to supply an aerial image measurement apparatus with information associated with the defective portion, the information including at least the coordinates of the defective portion and at least a portion of the reference image encompassing the coordinates, and to receive a criticality of the defective portion from the aerial image measurement apparatus,
wherein the threshold value is updated based on a correlation between the received criticality of the defective portion and the threshold value used by the comparison unit to determine the defective portion,
wherein the criticality is determined by the aerial image measurement apparatus using comparison reference information corresponding to the coordinates of the defective portion and generated based on the portion of the reference image, and an aerial image corresponding to the coordinates of the defective portion that is transfer-exposed by the aerial image measurement apparatus.

2. The mask inspection apparatus according to claim 1, further comprising a pattern data extraction unit configured to set a predetermined dimension range encompassing the coordinates of the defective portion to a unit of a cluster or cell of the design data and to extract a same portion as the predetermined dimension range of pattern data for designating inspection sensitivity in which importance of each pattern is designated for the pattern data;
wherein the information associated with the defect includes the same portion of the pattern data for designating the inspection sensitivity.

3. A mask inspection apparatus comprising:
an optical image acquisition unit configured to acquire an optical image by irradiating light on a mask;
a reference image generation unit configured to generate a reference image from design data of the mask;
a comparison unit configured to obtain coordinates of a defective portion of the mask determined to be defective by comparing the optical image with the reference image; and
an interface unit configured to supply an aerial image measurement apparatus with information associated with the defective portion, the information including the defect coordinates and at least a portion of the reference image encompassing the coordinates of the defective portion,
wherein information of a criticality of the defective portion determined based on a calculated value of error of a line width and a hole diameter by using comparison reference information that is generated by applying the defect coordinates to the reference image of the defective portion in the aerial image measurement apparatus, and an aerial image that corresponds to the defective portion transfer-exposed by the aerial image measurement apparatus, is supplied via the interface unit; and
a correlation between the supplied criticality and a threshold value used to determine the defect is obtained and the threshold value based on the correlation is reconfigured, in the comparison unit.

4. The mask inspection apparatus according to claim 3, wherein the correlation is a relationship that decreases the threshold value when the criticality is determined to be large, and is a relationship that increases the threshold value when the criticality is determined to be small.

5. A mask evaluation method for evaluating a mask by combining a mask inspection apparatus configured to inspect a defect of a mask by irradiating light on the mask, and an aerial image measurement apparatus configured to optically simulate an aerial image transfer-exposed from the mask by an exposure device, the mask evaluation method comprising:

comparing an optical image acquired by irradiating light on the mask with a reference image generated from design data of the mask to determine a defective portion of the mask based on a threshold value and adjusting the comparing based on criticality information of the defective portion, wherein the criticality information of the defective portion represents a scale of a degree of influence of the defective portion of the mask in a case of exposure transfer of the defective portion on the wafer;

obtaining coordinates of the defective portion determined to be defective by the comparing and at least a portion of the reference image encompassing the coordinates of the defective portion;

supplying information associated with the defect from the mask inspection apparatus to the outside of the mask inspection apparatus to obtain the criticality information of the defective portion using aerial image measurement of the mask corresponding to the defective portion, the information including at least the coordinates of the defective portion and the portion of the reference image encompassing the coordinates;

receiving a criticality of the defective portion from the aerial image measurement apparatus which is determined by the aerial image measurement apparatus based on an aerial image corresponding to the defective portion of the mask by applying the defect coordinate of the defective portion and the pattern data; and updating the threshold value based on a correlation between the received criticality of the defective portion and the threshold.

6. The mask evaluation method according to claim 5, further comprising:

setting a predetermined dimension range encompassing the coordinates of the defective portion to a unit of a cluster or cell of the design data; and extracting a same portion as the predetermined dimension range of pattern data for designating inspection sensitivity in which importance of each pattern is designated for the pattern data;

wherein the information associated with the defect includes the same portion of the pattern data for designating the inspection sensitivity.

7. A mask evaluation method for evaluating a mask by combining a mask inspection apparatus configured to inspect a defect of a mask by irradiating light on the mask, and an aerial image measurement apparatus configured to optically simulate an aerial image transfer-exposed from the mask by an exposure device, the mask evaluation method comprising:

comparing an optical image acquired by irradiating light on the mask with a reference image generated from design data of the mask;

obtaining coordinates of a defective portion determined to be defective by the comparison and at least a portion of the reference image encompassing the coordinates of the defective portion;

supplying information associated with the defect from the mask inspection apparatus to the aerial image measurement apparatus, the information including the defect coordinates and the portion of the reference image;

supplying information of a criticality of the defective portion determined based on a calculated value of error of a line width and a hole diameter, by using comparison reference information that is generated by applying the defect coordinates to the reference image of the defective portion in the aerial image measurement apparatus, and an aerial image that corresponds to the defective portion transfer-exposed by the aerial image measurement apparatus, from the aerial image measurement apparatus to the mask inspection apparatus;

obtaining a correlation between the supplied criticality and a threshold value used to determine the defect; and reconfiguring the threshold value based on the correlation.

8. The mask evaluation method according to claim 7, wherein the correlation is a relationship that decreases the threshold value when the criticality is determined to be large, and is a relationship that increases the threshold value when the criticality is determined to be small.

9. A mask evaluation system for evaluating a mask by combining a mask inspection apparatus configured to inspect a defect of a mask by irradiating light on the mask, and an aerial image measurement apparatus configured to optically simulate an aerial image transfer-exposed from the mask by an exposure device: wherein the mask inspection apparatus comprises;

an optical image acquisition unit configured to acquire an optical image by irradiating light on a mask;

a reference image generation unit configured to generate a reference image from design data of the mask;

a comparison unit configured to compare the optical image with the reference image, to obtain coordinates of a defective portion determined to be defective by the comparison unit and at least a portion of the reference image encompassing the coordinates; and an interface unit configured to supply an aerial image measurement apparatus with information associated with the defect, the information including the coordinates of the defective portion and the portion of the reference image encompassing the coordinates:

wherein the aerial image measurement apparatus comprises:

a comparison reference information generation unit configured to generate comparison reference information by applying the defect coordinates from the reference image of the defective portion;

an optical system configured to irradiate illumination light passing through a filter on the mask and to acquire an aerial image corresponding to the defective portion transfer-exposed by a CCD camera provided on a focal plane through an aperture; and a criticality determination unit configured to determine a criticality based on a calculated value of error of a line width and a hole diameter using the comparison reference information and an aerial image corresponding to the defective portion.

10. The mask evaluation system according to claim 9, further comprising a pattern data extraction unit configured to set a predetermined dimension range encompassing the coordinates of the defective portion to a unit of a cluster or cell of the design data and to extract a same range of the predetermined dimension range of pattern data for designating inspection sensitivity in which importance of each pattern is designated for the pattern data;

wherein the information associated with the defect includes the same portion of the pattern data for designating the inspection sensitivity.

11. The mask evaluation system according to claim 9, wherein the comparison unit obtains a correlation between the criticality supplied from the aerial image measurement apparatus via the interface unit and a threshold value used to determine the defect in the comparison unit, and reconfigures the threshold value based on the correlation.

12. The mask evaluation system according to claim 11, wherein the correlation is a relationship that decreases the threshold value when the criticality is determined to be large, and is a relationship that increases the threshold value when the criticality is determined to be small.

13. The mask evaluation system according to claim 9, wherein the criticality determination unit is an independent configuration from the mask inspection apparatus and the aerial image measurement apparatus, and the criticality determination unit is configured to receive the comparison reference information and the aerial image corresponding to the defective portion from the aerial image measurement apparatus, and to determine the criticality.

* * * * *